United States Patent
Chan et al.

(10) Patent No.: US 6,178,461 B1
(45) Date of Patent: Jan. 23, 2001

(54) CACHE-BASED COMPACTION TECHNIQUE FOR INTERNET BROWSING USING SIMILAR OBJECTS IN CLIENT CACHE AS REFERENCE OBJECTS

(75) Inventors: Mun-Choon Chan, Edison; Thomas Yat Chung Woo, Red Bank, both of NJ (US)

(73) Assignee: Lucent Technologies Inc., Murray Hill, NJ (US)

(*) Notice: Under 35 U.S.C. 154(b), the term of this patent shall be extended for 0 days.

(21) Appl. No.: 09/207,196

(22) Filed: Dec. 8, 1998

(51) Int. Cl.[7] .................................................. G06F 13/00
(52) U.S. Cl. ........................ 709/247; 709/219; 709/246
(58) Field of Search .................................. 709/217, 218, 709/219, 230, 232, 246, 247, 313, 328, 329

(56) References Cited

U.S. PATENT DOCUMENTS

| | | | |
|---|---|---|---|
| 5,931,904 | * | 8/1999 | Banga et al. .......................... 709/217 |
| 5,946,697 | * | 8/1999 | Shen ...................................... 707/104 |
| 5,991,713 | * | 11/1999 | Unger et al. .............................. 704/9 |
| 6,101,328 | * | 8/2000 | Bakshi et al. ......................... 395/712 |
| 6,105,021 | * | 8/2000 | Berstis ...................................... 707/3 |

OTHER PUBLICATIONS

V. N. Padmanabhan et al., "Using Predictive Prefetching to Improve World Wide Web Latency," *Computer Communication Review*, ACM, Jul. 1996.

J. Griffioen et al., "The Design, Implementation, and Evaluation of a Predictive Caching File System," *Technical Report CS–264–96*, Department of Computer Science, University of Kentucky, Lexington, KY, Jun. 1996.

J. J. Hunt et al., "An Empirical Study of Delta Algorithms," *IEEE Software Configuration and Maintenance Workshop*, Mar. 1996.

G. Banga et al., "Optimistic Deltas for WWW Latency Reduction," *Proceedings of the USENIX Technical Conference*, 1997.

J. C. Mogul, "Potential benefits of delta encoding and data compression for HTTP," *Proceedings of the ACM SIGCOMM*, pp. 181–194 (1997).

T. M. Kroeger et al., "Exploring the Bounds of Web latency Reduction from Caching and Prefetching," USENIX Symposium on Internet Technologies and Systems (Dec. 1997).

J. Ziv et al., "A Universal Algorithm for Sequential Data Compression,"IEEE Transaction of Information Theory, IT–23 (3), pp. 337–343, May 1997.

J. Ziv et al., "Compression of Individual Sequences via Variable–Rate Coding," IEEE Transaction of Information Theory, IT–24(3), pp. 530–536 (Sep. 1977).

B. C. Housel et al., "WebExpress: A System for Optimizing Web Browsing in a Wireless Environment," *Proceedings of the Second Annual International Conference on Mobile Computing and Networking*, Rye, New York, pp. 108–116 (Nov. 1996).

D. Wessels et al., "ICP and the Squid Web Cache," *IEEE Journal on Selected Areas in Communication*, 16(3), pp. 345–357 (Apr. 1998).

\* cited by examiner

*Primary Examiner*—Viet D. Vu
(74) *Attorney, Agent, or Firm*—Barry H. Freedman

(57) ABSTRACT

The amount of information that must be transmitted from an Internet server to a user's computer or workstation when the user requests an Internet object, for example, by clicking on a URL in a web browser application, is reduced using a cache-based compaction technique in which the requested object is encoded in the server using information relating to similar objects that were previously supplied to the user. Similar objects available in both a client side cache and a server side cache are selected by comparing the URL of the requested object to the URL's of stored objects. Differential encoding is performed in the server such that the server transmits to the client information indicative of the differences between the requested object and the reference (similar) objects available in the server cache. A corresponding decoding operation is performed in the client, using the encoded version and reference objects available in the client cache.

14 Claims, 7 Drawing Sheets

CLIENT SIDE PROXY PROCESSING

SERVER SIDE PROXY PROCESSING

ENCODING

SELECTION

DECODING

PATH SIMILARITY AND PATH DIFFERENCE

CACHE-BASED COMPACTION TECHNIQUE FOR INTERNET BROWSING USING SIMILAR OBJECTS IN CLIENT CACHE AS REFERENCE OBJECTS

FIELD OF THE INVENTION

The present invention relates generally to the transfer of information from an Internet web server to a user, and, more particularly, to a technique that increases the speed at which information from the Internet is made available to the browser running on the user's computer or work station from the proxy server using cache-based compaction.

BACKGROUND OF THE INVENTION

Despite the phenomenal growth of the Internet, the advances in the means and speed of access to the Internet has not caught up. In particular, the last hop between (a) the Internet site to which the user is connected, such as the user's Internet Service Provider (ISP) and (b) the computer or workstation on is which the user is running a browser application, is still mainly implemented as a connection over a telephone line using a traditional modem, with communication speeds up to only 56 kbps. The emerging cable modem and ADSL technology promise to change that, but their widespread deployment and adoption are still years away.

Separately, the use of wireless communications links in the last hop is gaining popularity. Its growth is fueled by the confluence of 3 factors: (1) the development of digital air interface protocols that support data (e.g., CDPD, IS-95, IS-136, GSM/GPRS); (2) the availability of new classes of portable Internet-capable end devices (e.g., Palm Pilot, Handheld PC, Nokia 9000) and wireless modems (e.g., Novatel Wireless); and (3) the falling usage cost for wireless communications. Again, the raw bandwidth available on most wireless channels is low (e.g., 19.2 kbps for CDPD), which can be further impaired by their multiple-access contention nature and protocol overhead. For example, the effective application layer throughput of CDPD is about 8 kbps without contention.

In a nutshell, Web browsing behind slow (wireline or wireless) access links will persist for years to come. Wireless Internet access, which is emerging only now, will present an even more severe problem.

A number of previous approaches have been suggested in order to reduce the delay incurred in the last hop. Most of these approaches involve increased usage of storage or computation to make up for limitations in the communication medium. This typically amounts to a trade-off, since storage and computational complexity each add overhead and cost to the system. The key to the success of any of these processing techniques is that the increase in processing delay should be more than offset by the decrease in transport delay, thus resulting in a decrease in the overall latency.

One technique, known as "caching", stores earlier responses, and reuses them to satisfy a repeated request. Traditionally, caching algorithms search for identical objects and the search is limited to objects with the same URL. These known compression algorithms do not take into account the presence of other objects in the cache. This topic has been studied extensively in the literature. See for example, Adam Dingle and Tomas Partl, "Web Cache Coherence", Fifth International World Wide Web Conference, May 1997; Bradley M. Duska, David Marwood, and Michael J. Feeley, "The Measured Access Characteristics of World-Wide-Web Client Proxy Caches", USENIX Symposium on Internet Technologies and Systems, Dec 1997; James Gwertzman and Margo Seltzer, "Worldwide Web Cache Consistency", Proceedings of the USENIX Technical Conference, 1996; A. Lutonen, H. F. Nielsen, and T. Berners-Lee, "Cern httpd", In http://www.w3.org/pub/WWW/Daemon/Status.html, July 1996; and Duane Wessels and K. Claffy, "Icp and the Squid Web Cache", IEEE Journal on Selected Areas in Communication, 16(3):345–357, April 1998.

Another technique, known as "prefetching", tries to predict, fetch and store a response before it is needed. In both caching and prefetching, the stored objects must be transferred at least once. In some cases, this transfer can be optimized by first transforming or compressing the objects to a smaller size. Prefetching, like caching, is based on fetching in advance the exact object that will be needed in the future. The utility of prefetching was studied by Venkata N. Padmanabhan and Jeffery C. Mogul, "Using Predictive Prefetching to Improve World Wide Web Latency", Computer Communication Review, ACM, July 1996, using a statistical algorithm described by James Griggioen and Randy Appleton in "The Design, Implementation, and Evaluation of a Predictive Caching File System", Technical Report CS-264-96, Department of Computer Science, University of Kentucky, Lexington, Ky., June 1996.

Compression can be achieved by the use of differential transfer to transmit only changes between current and past information. Usually, only two objects of the same URL are considered at a time. Some of the differencing algorithms used are UNIX diff and vdelta, as described by J. Hunt, K. P. Vo, and W. Tichy, "An Empirical Study of Delta Algorithm", IEEE Software Config. and Maint. Workshop, March 1996; and J. Hunt, K. P. Vo, and W. Tichy, "An Empirical Study of Delta Algorithms", IEEE Software Config. and Maint. Workshop, March 1996; In a paper by Gaurav Banga, Fred Douglis, and Michael Rabinovich, "Optimistic Deltas for WWW Latency Reduction", USENIX, 1997, the difference between two versions of the same page was computed in order to reduce transfer size. Dynamic pages including output of CGI scripts with different parameters, were also considered for differencing. The issue of what objects should be used in differencing has been mentioned in the literature, but is at present considered to be an open question. The benefits of delta coding was also studied by Jeffery C. Mogul, Fred Douglis, Anja Feldmann, and Balachander Krishnamurthy, "Potential Benefits of Delta Encoding and Data Compression for Http", Proceedings of the ACM SIGCOMM, pages 181–194, 1997.

The limits of latency reduction obtainable from caching and prefetching, based on search for objects with same the URL, was studied by Thomas M. Kroeger, Darrell D. E. Long, and Jeffrey C. Mogul, "Exploring the Bounds of Web Latency Reduction from Caching and Prefetching", USENIX Symposium on Internet Technologies and Systems, December 1997. They have found that caching and prefetching can reduce latency by at best 26% and 57%, respectively. Accordingly, there is a significant need for an improved latency reduction technique.

SUMMARY OF THE INVENTION

In accordance with the present invention, the amount of information that must be transmitted from an Internet server to a user's computer or workstation when the user requests an Internet object, for example, by clicking on a URL in a web browser application, is reduced using a cache-based compaction technique in which the requested object is encoded in the server using information relating to similar objects that were previously supplied to the user.

More specifically, when a user requests an object, and that object is not already in the client's local cache, similar objects in the local cache are identified, and a request is sent to the level-1 proxy server to retrieve the desired object, using a set of stored objects that are similar to the requested object. If the requested object is not in that server's cache, it is fetched from the origin server. However, instead of sending the actual object over the last hop between the level-1 proxy server to the client, the object is encoded using as reference objects the similar objects that are already available in the cache. The more "similar" the reference objects are to the requested object and the more such "similar" reference objects are available in the client's possession, the smaller is the resulting transfer. The encoded information received by the client processor is then decoded in conjunction with the set of similar objects in the local cache that were previously identified, and the decoded information is presented to the browser application.

In accordance with one aspect of the present invention, the selection of reference objects is based upon the notion that objects that are similar in content tend to have similar names or URLs. Therefore, by selecting one or more reference objects with similar URLs for encoding the requested object, the probability of finding similar content in the set of reference objects increases, leading to a smaller encoded reference object.

In accordance with another aspect of the present invention, the encoding process uses a universal data compression algorithm that utilizes similar content in the set of selected reference objects, as well as the object itself. The extended data dictionary allows more common strings to be found between the object to be compressed and the reference objects. These common strings are encoded in a very concise way by encoding only the locations and sizes of the common strings in the reference objects. As a result, the encoded object is significantly smaller than the original object.

BRIEF DESCRIPTION OF THE DRAWING

The present invention will be more fully appreciated by consideration of the following detailed description, which should be read in light of the accompanying drawing in which.

DETAILED DESCRIPTION

Figure 1:
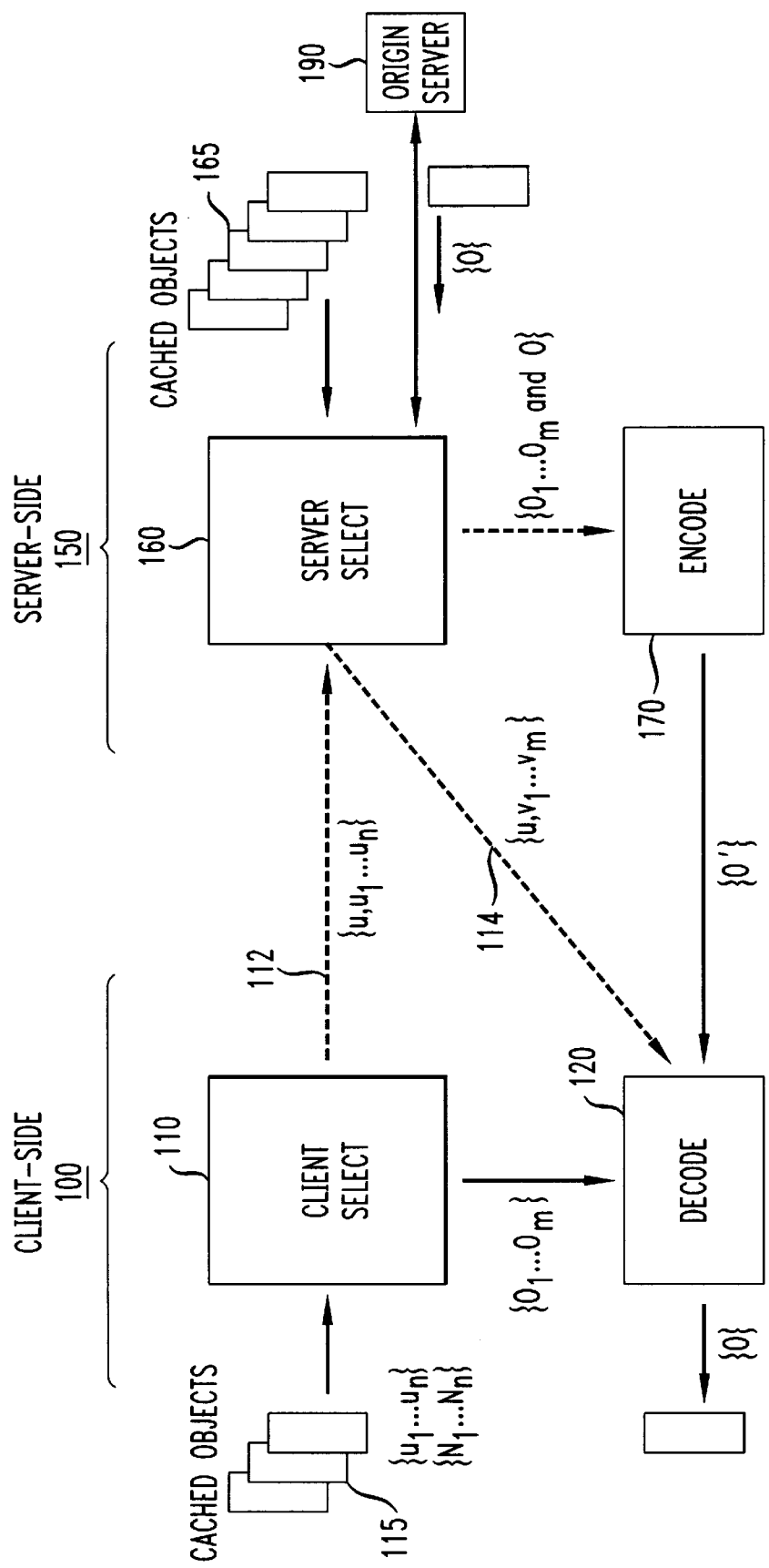
FIG. 1 is a diagram illustrating the principal processes performed in accordance with the present invention.

The cache-based compaction technique embodied in the present invention reduces the size (and optimizes the latency) of Web transfers using two principal components: (1) a selection process for choosing reference objects, and (2) an encoding/decoding process that encodes and decodes a new object using a collection of reference objects. In order to obtain an overview of the cache based compaction technique used in the present invention, reference is made first to FIG. 1, which illustrates graphically the principal processes performed in accordance with the present invention. Generally, the processes of FIG. 1 are performed either on the client side 100, for example, in the computer of an Internet user, or on the server side 150, in a server that is illustratively the level-1 cache server to which the user is connected. The level-1 cache server is generally a cache server that serves a group of users within a domain and caches objects that have been accessed by these users. Such a cache server is used in addition to the level-0 caching that is performed by most Internet browsers. The client side processes of FIG. 1 are invoked when a user, operating a browser application, such as Microsoft's Internet Explorer or Netscape's Navigator, desires to view a particular Internet object. Generally, this is accomplished when the user clicks on the URL of a link that is displayed on the user's computer screen.

When a user at client side 100 issues a select request identifying a desired object (O) by its URL (u), a client select process 110 is invoked. (This process is described more fully in connection with FIG. 2 below). If it is determined that the requested object (O) is not already stored in the local cache in the user's computer, then the identities $\{u_1 \ldots u_n\}$ of a set of cached objects $\{N_1 \ldots N_n\}$ 115 that are similar to the requested object are identified. The identity of these objects $\{u_1 \ldots u_n\}$ is then communicated to the server side 150 by a control signal, indicated by the dashed line 112.

The identification information $\{u_1 \ldots u_n\}$ is used to invoke a server select process 160 that obtains the same cached objects $\{N_1 \ldots N_n\}$ 165 from the server cache, and applies the objects, which are used as "reference objects", to an encode process 170. In general, zero or more of the $\{N_1 \ldots N_n\}$ objects can be found in the server cache. Let the number of referenced objects found be $\{O_1 \ldots O_m\}$ with identities $\{v_1 \ldots v_m\}$, where m is less than or equal to n. Concurrently, the server looks for the object with identity (u) in its cache. If the object is not in its cache, a request for the object with identity (u) is transmitted through the Internet 303 to the origin server 190 that contains the object. The object is returned to the server for use in encode process 170 together with cached objects $\{O_1 \ldots O_m\}$. (Note that this retrieval occurs over relatively fast links, as opposed to the last hop between the first level proxy server and the client side processor.)

Figure 4:
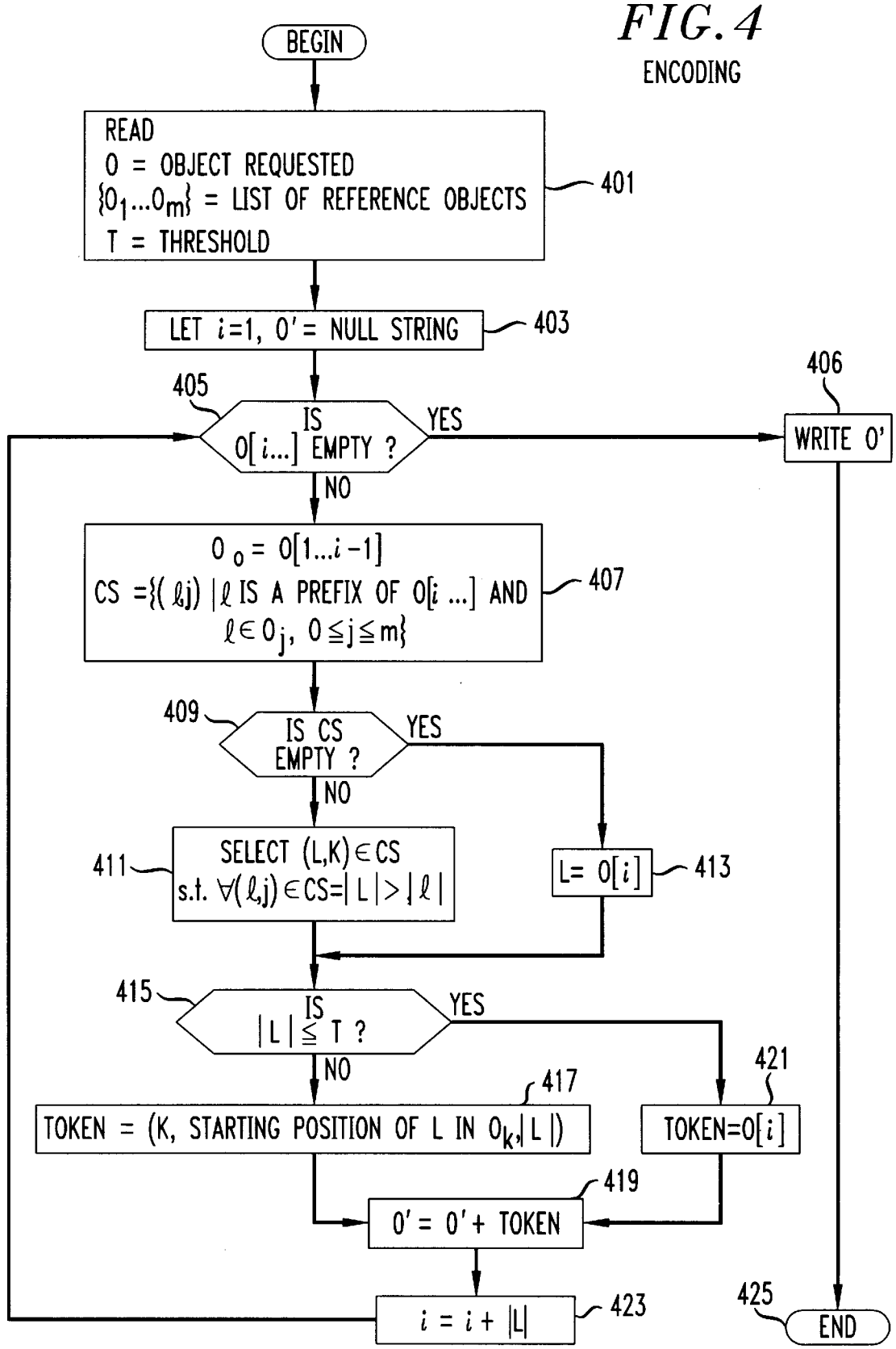
FIG. 4 is a diagram illustrating the encoding process performed in step 309 of FIG. 3

Encode process 170, which is described in more detail below in conjunction with FIG. 4, is arranged to form an encoded compressed version (O') of the requested object using the reference objects as a code dictionary. In this way, the output (O') of encode process 170 represents the requested object, but in a much more compact and efficient form. The encoded compressed version is transmitted back to the client side processor, for use in a decode process 120, which also receives the reference objects $\{O_1 \ldots O_m\}$ from the client select process 110. Decode process 120, which is described in more detail below in conjunction with FIG. 6, uses the reference objects $\{O_1 \ldots O_m\}$ together with the encoded compressed version to generate the desired object O, which is passed to the user's browser application.

Conceptually, if complete knowledge of caching policy is known, then either the client proxy or the server proxy can choose the reference objects. In practice, however, such knowledge is rarely synchronized. Thus, a distributed implementation of the selection algorithm is used. Specifically, the client proxy first selects the reference objects $\{u_1 \ldots u_n\}$. This information is communicated to the server proxy as part of the request in a new header "HAVE". Upon receiving the request, the server proxy uses the set of objects listed in the "HAVE" header as the basis to determines a subset, $\{v_1 \ldots v_m\}$, which will actually be used for encoding. The specific subset chosen is communicated back to the client proxy as part of the response in a new header "USE." This is illustrated in FIG. 1 by the dotted line labeled 114.

From the foregoing description, it is seen that a convenient way to implement the compaction technique of the present invention without modifying the client or the server is to employ proxying. Specifically, we interpose two cooperating proxies, one on the client side and the other on the server side, between the actual client and server. Note that the server (or the client for that matter) can itself be a proxy cache server. In the latter case, the compaction feature can be integrated with the proxy caching feature.

While the present invention is, at a high level, an extension of the universal compression algorithm described by Jacob Ziv and Abraham Lempel in "A Universal Algorithm for Sequential Data Compression", IEEE Transaction on Information Theory, IT-23(3), 333–343, May 1977, the present technique differs in that it looks for similar content from a selected set of reference objects, in addition to the object itself. Furthermore, while the present invention can be viewed generally as a differential transfer technique in that it compresses out the similar parts, and transfers mainly the differences, it is unlike existing differential transfer techniques, because the measure of "similarity" that is used is not restricted to just objects from earlier versions. Rather, with the present approach, multiple objects (with completely different URLs) in the client's cache can potentially be used.

Figure 2:
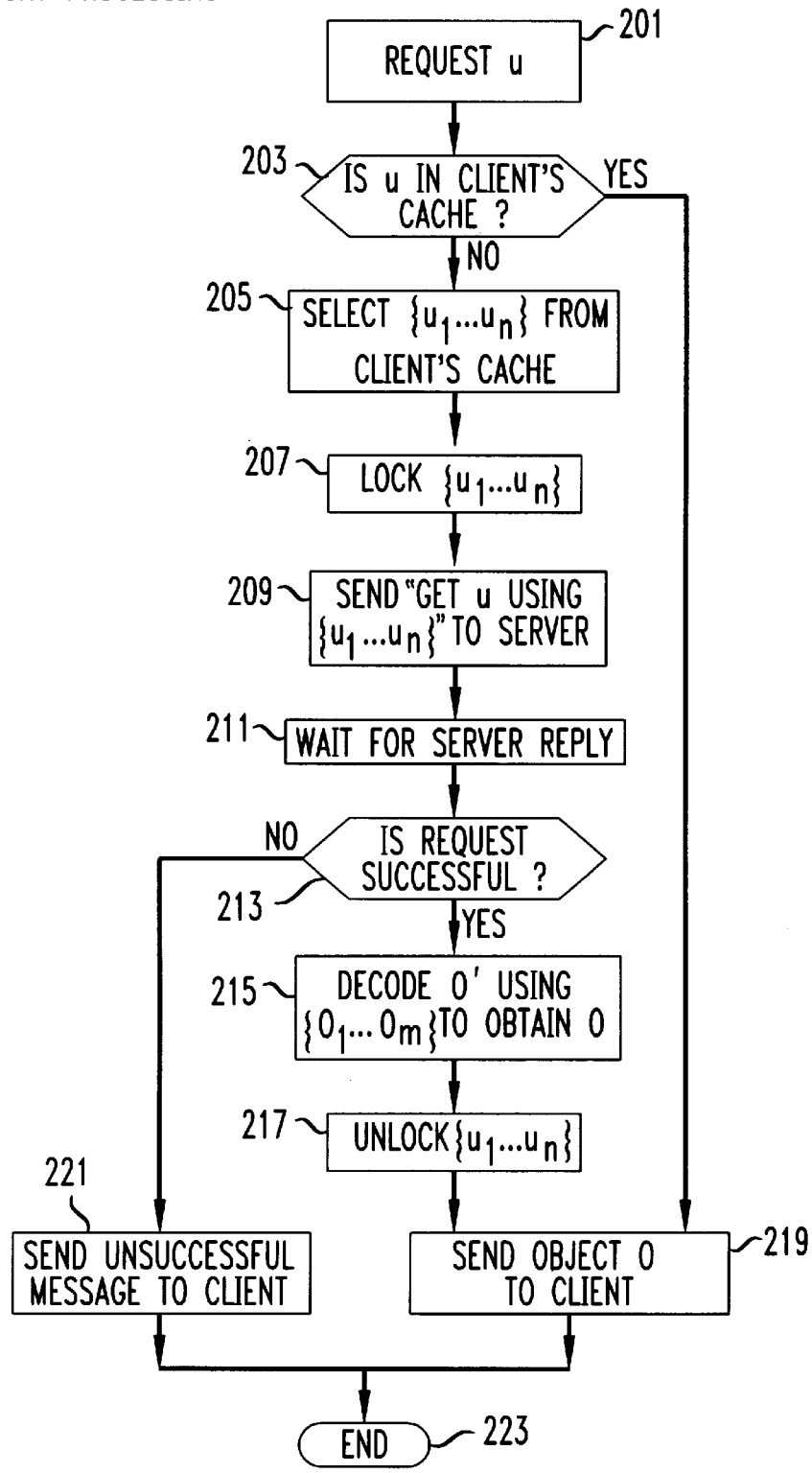
FIG. 2 is a diagram illustrating in more detail the client side proxy process of FIG. 1.

Referring now to FIG. 2, there is shown a diagram illustrating in more detail the client side (proxy) process of FIG. 1. Processing begins in step 201 when a request for an object O with name u is sent to the client-side proxy processor. Typically, this request is generated when a user clicks on a link in a web browser application. In step 203, the client proxy checks to see if the object O is in its local cache. If object O is in the cache, a "yes" result is obtained in step 203, and the requested object O is returned to the client in step 219. The object is then displayed on the user's browser application. Processing then ends in step 219. This operation is similar to present day caching, since the identical object to the one sought by the user was already available locally, and there was no need to fetch the object from a remote server or from the origin server.

If the requested object was not available in the local cache, and the result in step 203 was "no", a selection process, described in more detail below in conjunction with FIG. 4, is used in step 205 to select n reference objects which are similar to the requested object that are present in the proxy client's cache. These reference objects, with names $\{u_1 \ldots u_n\}$, are then locked in step 207 so as to ensure that they will be present when the server replies. The request consisting of the name of the request object u and the names of the reference objects $\{u_1 \ldots u_n\}$ are then sent to the proxy server in step 209. The client then waits, in step 211, for the server to reply.

Figure 6:
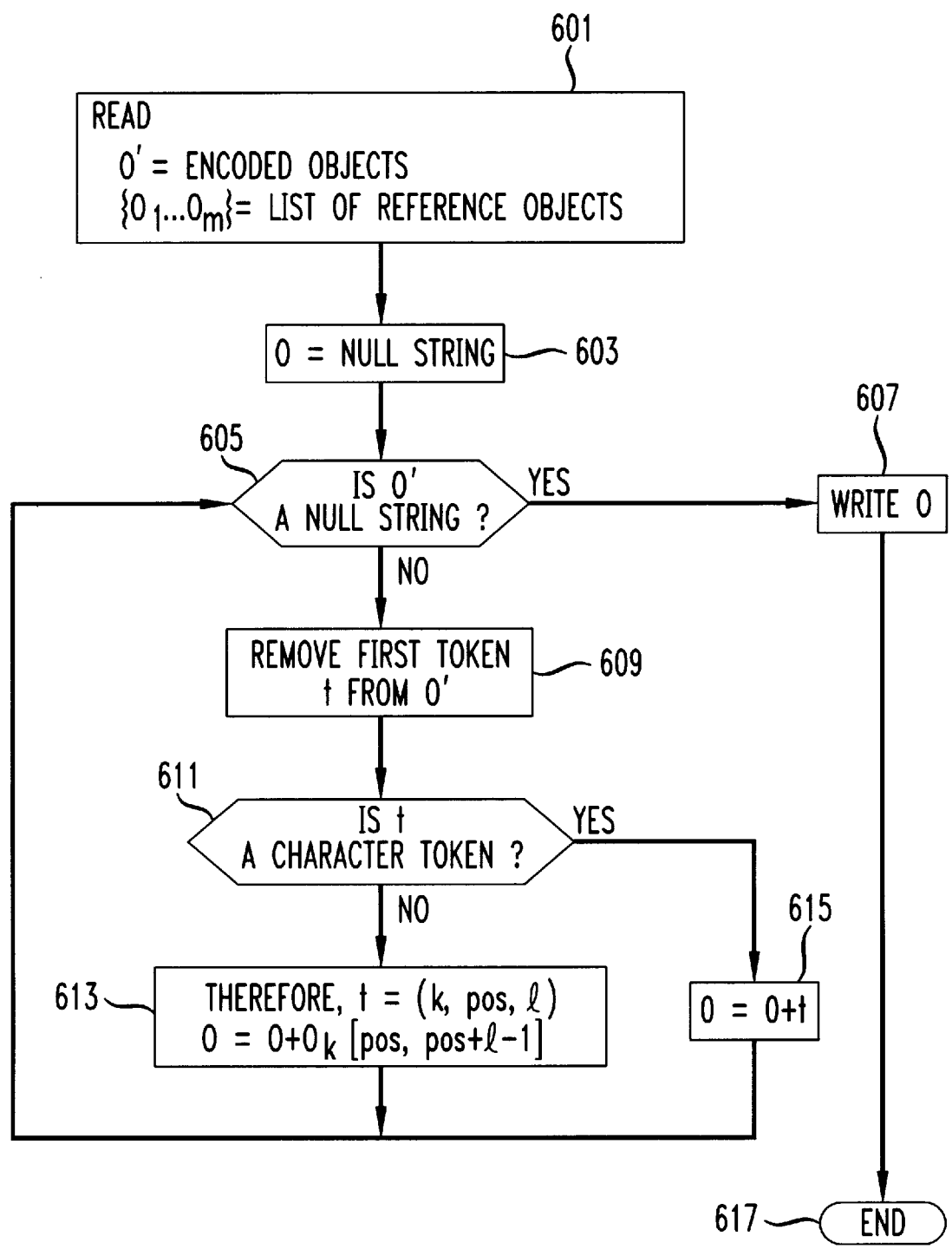
FIG. 6 is a diagram illustrating the decoding process performed in step 215 of FIG. 2.

In accordance with the present invention, the server is arranged to reply (in step 305 of FIG. 3, discussed below) with either a successful or an unsuccessful message, and this reply is processed in step 213. If the reply is unsuccessful, a "no" result occurs in step 213, and an unsuccessful message is sent to the client in step 211. The process then ends in step 223. Exception handling is performed by the application (browser). If the reply is successful, a "yes" result occurs in step 213, and the reply from the server contains O', the encoded version of object O, plus the names of reference objects $\{v_1 \ldots v_m\}$ that the proxy server used to encode the object O. This list of names $\{v_1 \ldots v_m\}$ is a subset of the original reference list $\{u_1 \ldots u_n\}$. In step 215, a decoding process, described in more detail below in conjunction with FIG. 6, is applied to the encoded object O' using the list of objects with names $\{v_1 \ldots v_m\}$. The object O thus obtained is sent to the client in step 219, after the list of reference objects with names $\{u_1 \ldots u_n\}$ is unlocked in step 217. The process then ends in step 223.

Figure 3:
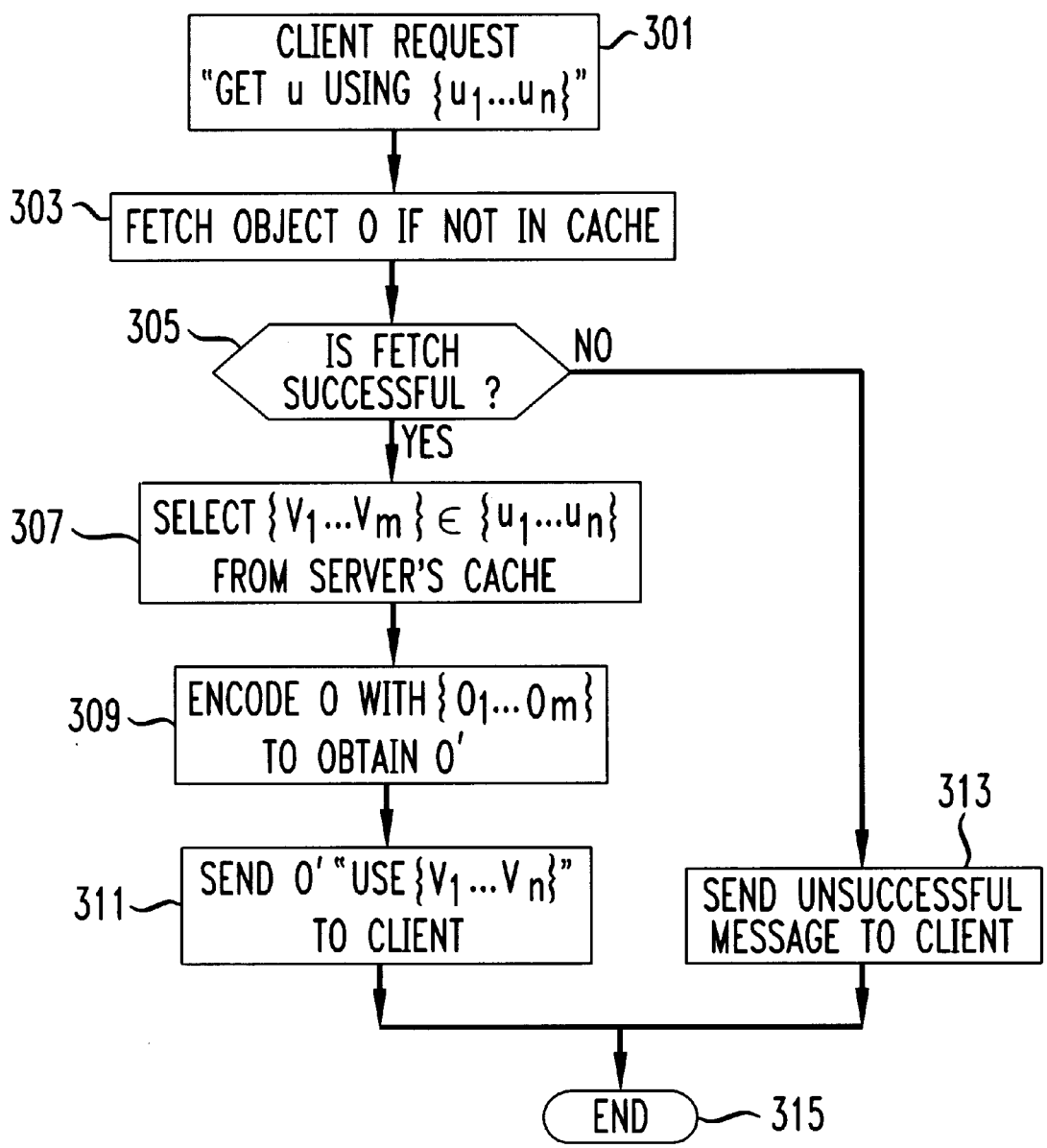
FIG. 3 is a diagram illustrating in more detail the server side proxy process of FIG. 1.

Referring now to FIG. 3, there is shown a diagram illustrating in more detail the server side proxy process of FIG. 1. Processing starts in step 301 when a request for object O with name u is received by the proxy server. The request will also specify that O should be encoded with the list of reference objects with names $\{u_1 \ldots u_n\}$. If object O is not present in the proxy server's cache, it is fetched, in step 303, from the Internet origin server. If the fetch is determined to be unsuccessful in step 305, a "no" result is obtained, and an unsuccessful message is sent to the proxy client in step 313, and the process terminates in step 315. Exception handling is performed by the application (browser) level. For example, if the origin server returns an invalid URL to the browser, the browser simply displays the error message returned.

If the fetch is successful and a "yes" result in obtained in step 305, a subset $\{O_1 \ldots O_m\}$ of the objects $\{N_1 \ldots N_n\}$ whose names $\{v_1 \ldots v_n\}$ are elements of the list $\{u_1 \ldots u_n\}$ and that are also present in the server's cache, are selected in step 307 and used as reference objects for the purpose of encoding, in step 309, the desired object O. The selection process used to determine the appropriate subset of objects is explained below, in connection with FIG. 5, and the encoding process is explained in connection with FIG. 4. The encoded object O', along with the list $\{v_1 \ldots v_m\}$ of objects used during the encoding is sent to the proxy client in step 311, whereupon the process is ended in step 315.

Referring now to FIG. 4, there is shown a diagram illustrating the encoding process performed in step 309 of FIG. 3. As stated previously, the encoding process is used to encode the object O using a list of n reference objects, $\{O_1 \ldots O_m\}$, such that the encoded version O' of object O is smaller than O. The underlying strategy for the encoding process is that a dictionary-based compression scheme (the most well known being the scheme described by Jacob Ziv and Abraham Lempel, "A Universal Algorithm for Sequential Data Compression", IEEE Transaction of Information Theory, IT-23(3):337–343, May 1977. See also Jacob Ziv and Abraham Lempel, "Compression of Individual Sequences via Variable-rate Coding", IEEE Transaction of Information Theory, IT-24(3):530–536, September 1977 family) works because of the recurrence of common substrings within a document. In other words, one part of document is similar to another part of itself. Furthermore, we also exploit the notion of similarity among multiple documents for reducing transfer. If a number of similar documents are already transferred from the web server to the client, transfer of the next similar document can be done in a more efficient manner. An object O is essentially viewed as a byte array, with O[i] denoting the i-th byte of O (we start counting from 1), O[.i] denoting the part of O from the beginning up to and including the i-th byte, and O[i.] denoting the part of O beginning at i-th byte of O to the end.

The measure of similarity is the number and length of common substrings. The longest substring that begins at the current pointer of object O and that is present in O (up to and excluding the current pointer) or $\{O_1 \ldots O_m\}$ is selected. If the longest substring is a null string or if the length of the substring is less than or equal to the threshold, the character indicated by the current pointer is appended to O and the current pointer is moved forward by one character. Otherwise, the triple {index of reference object, starting position of common substring in reference object, length of substring} is appended to O' and the current pointer is moved forward by the length of the substring. If the current pointer is not pointing at the end of the object O, the procedure is repeated. Otherwise, O' is obtained.

Referring specifically to FIG. 4, a threshold parameter T is defined to make sure that the O' is indeed smaller than or equal to O. This is achieved by setting T to be larger or equal to the overhead of encoding the triple. Each of the required parameters, namely O, $\{O_1 \ldots O_m\}$, and T, are read in step 401. Also, in step 403, O' is initialized to a null string and the current pointer is set (i=1) to the beginning of the object O.

In step 405, a determination is made as to whether O[i . . . ] is empty, indicating that the entire object has been processed. If so, a "yes" result is obtained in step 405, the value of O' is written (or output) in step 406, and the process terminated in step 425. If not, a "no" result in obtained in step 405, and the process proceeds to step 407. In steps 407 through 423, there is a search for the longest common substring between the part of o currently being processed and the part of o that has been processed (O' specifically) together with the m reference objects $\{O_1 \ldots O_m\}$. More particularly, in step 407, all prefixes of O[i.] that are present in the reference objects are put into the set CS. Step 409 checks if CS is empty. If CS is empty, no common substring is found and the string L is set to be the character indicated by the current pointer in step 409. If CS is not empty, step 411 sets L to be the longest substring in CS. In case of a tie, the substring from the reference object with the smallest index is selected. Step 415 checks to determine if the length of L is greater than T or not. If this is true, step 417 is performed and the triple is encoded. Otherwise, step 421 is performed and the first character under the current pointer is encoded. The encoded string is appended to O' in step 419 and the current pointer is advanced by the length of L in step 423.

It should be clear that the encoding process described above is lossless. Though it works for any objects, it is most applicable to text (e. g., plain ascii, HTML) objects. For graphical objects that are already in compressed form (e. g., GIF,JPEG), the amount of non-trivial similarity among objects is minimal. In particular, even pictures that are "visually" similar do not share significant similarity in their coded forms. Besides, the size of a graphical object is directly proportional to its quality. Advanced compression techniques exist that can drastically reduce the size of a graphical object while retaining most of its "visible" quality. Thus, for present purposes, we use compaction on text objects only.

Turning now to consideration of the selection process by which the objects $\{N_1 \ldots N_n\}$ are determined, we begin with the recognition that for a good compression result, the selection algorithm needs to be able to pick a set of reference objects that are similar to the requested object. While examining the content of the objects is the only sure way of deciding if they are similar, this process is too computationally expensive, especially when the collection of objects is large (e. g., all the objects in a cache). Therefore, the present invention must use heuristics based on other attributes of the objects.

Among possible other attributes, we have found that it is advantageous to use the name or the Uniform Resource Locator (URL) of the objects in the process of selection. Generally, it would seem that the URL would not tell much about an object's content. However, we have found that the structure of a URL may provide good hints for a successful selection process.

By treating URL's as path names, a collection of objects can be viewed as leaves in a forest, with all objects from the same site represented in a distinct tree. We observed that a large majority of sites tend to follow a consistent design style, which translates into the use of similar structure and formatting instructions. Additionally, we found that the hierarchy is often structured in terms of related topics, and objects pertaining to similar topics tend to share common content.

In summary, we believe that Web documents that are "close" together in the hierarchy formed by their URLs tend to be more similar than those that are "far apart." Our selection process is thus different from the differencing scheme described in Gaurav Banga, Fred Douglis, and Michael Rabinovich, "Optimistic Deltas for WWW Latency Reduction", USENIX, 1997; Barron C. Housel and David B. Lindquist, "Webexpress: A System for Optimizing Web Browsing in a Wireless Environment", Proceedings of the Second Annual International Conference on Mobile Computing and Networking, pages 108–116, November 1996; and Jeffery C. Mogul, Fred Douglis, Anja Feldmann, and Balachander Krishnamurthy, "Potential Benefits of Delta Encoding and Data Compression for Http", Proceedings of the ACM SIGCOMM, pages 181–194, 1997, where an older version of a document with the same URL is used to compute the delta for transferring a newer version of the document.

To precisely specify our heuristics, we first introduce some notations. Let u and u' be two URLs. (Note that since we consider only HTTP URLs, for ease of our disposition, we assume the protocol part has been omitted.) They are written respectively as $h/p_1/p_2/ \ldots p_n$ and $h'/q_1/q_2/ \ldots /q_m$. Each of the h; h'; $p_i$ and $q_i$ is called a segment. The length of an URL is defined as the number of segments in the URL. Thus, |u|=n+1. We define an enumerator function [.] for URL as follows: u[0]=h, and for $1 \leq i \leq n$, u[i]=$p_i$. Additionally, u[i.j] is the path u[1]/ . . . /u[j]. p is a prefix of u if for all $0 \leq i \leq |p|$, p[i]=u[i]. p is a common prefix of u and u' if p is a prefix of both u and u'. We define the path similarity between two URLs u and u' as:

path-sim(u; u')=length of the longest common prefix of u and u' and their path difference as:

$$\text{path-diff}(u; u')=|u|+|u'|-2*\text{path-sim}(u; u')$$

Figure 7:
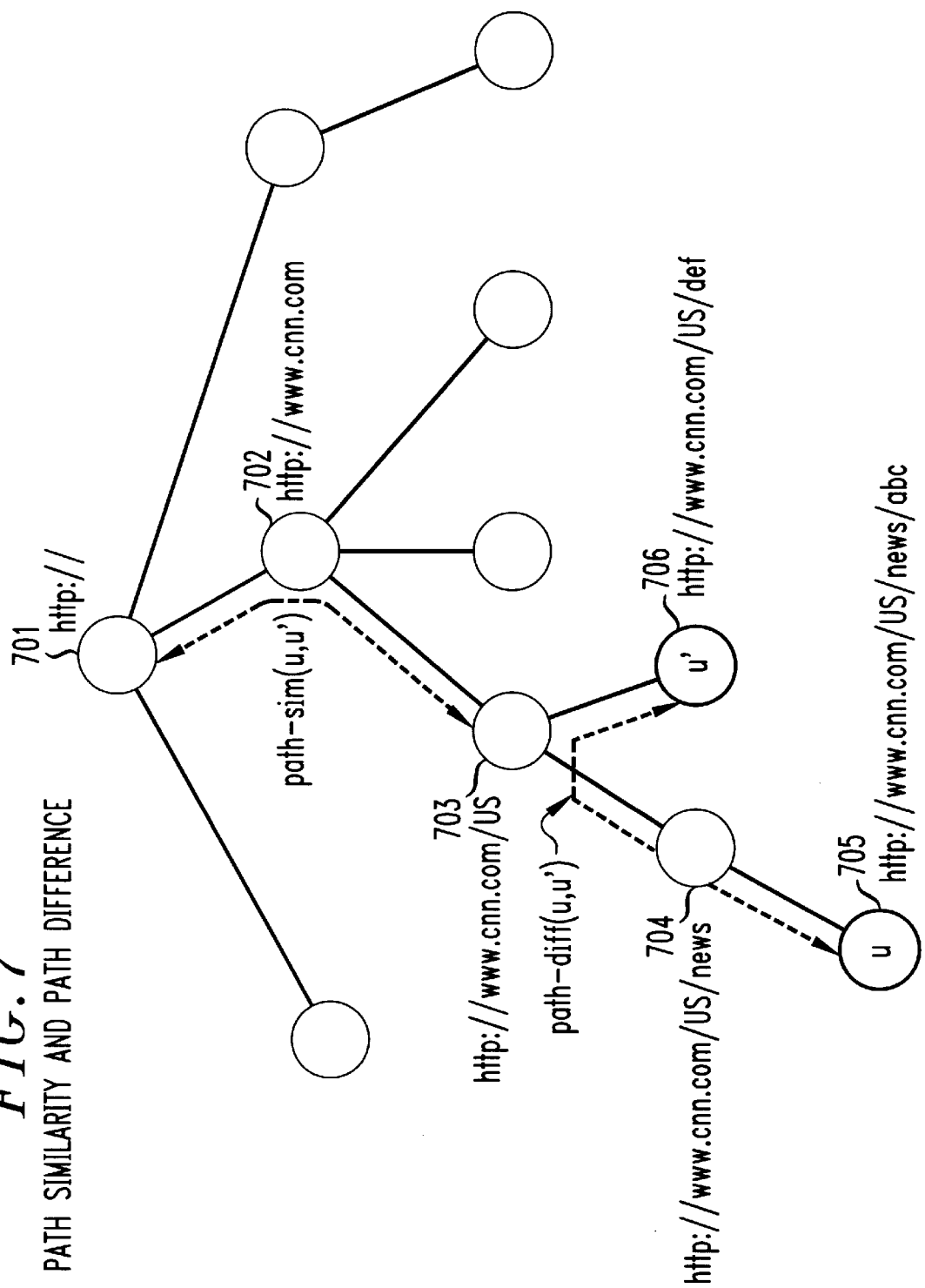
FIG. 7 is a diagram graphically illustrating the concepts of path similarity and path difference.

These definitions are graphically illustrated in FIG. 7. In this figure, a tree and branch structure includes a root node 701 representing the base URL http://. Several branches extend from this root node, including a first branch through node 702, which has the URL http://www.cnn.com. From node 702, several branches again extend, including one to node 703 having the URL http://www.cnn.com/US. From node 703, a first branch extends to node 706, having the first URL (u') of interest. The URL for node 706 is http://www.cnn.com/US/def. From node 703, a second branch extends through node 704 (with URL http://www.cnn.com/US/news) to node 705, having the second URL (u) of interest. The URL for node 705 is http://www.cnn.com/US/news/abc. As seen in FIG. 7, the path similarity for nodes 705 and 706 is 3, since two nodes, namely, nodes 701, 702 and 703 are shared in common on the path from node 701 to the target nodes. On the other hand, the path difference for nodes 705 and 706 is 3, since there are three nodes in the shortest path between these nodes, namely, nodes 704, 705 and 706.

Two nodes from different Web sites have path similarity of 1. When the path difference between two nodes is 0, the nodes have the same URL. If the path difference is 2, these two nodes share a common parent node. In summary, the path difference indicates the number of "hops" it takes to go from one node to the other in the tree hierarchy and the path similarity indicates the number of common ancestor nodes.

With the above, we are now ready define a similarity relationship. Given a URL u, the similarity ordering relative to u, denoted by $\sqsupseteq_u$, is defined as follows:

$u1 \sqsupseteq_u u2$ iff path−sim$(u;u_1) \geq$ path−sim$(u; u_2)$ and path−diff$(u; u_1) \leq$ path−diff$(u;u_2)$ This essentially says that a URL $u_1$ is considered more similar to URL u than another URL $u_2$ if u and $u_1$ share a longer common prefix and it takes fewer hops to go from u to $u_1$ than from u to $u_2$. In other words, u and $u_1$ share more common path and fewer disjoint hops. It is easy to see that $\sqsupseteq_u$ is a partial ordering.

A precise selection policy requires a total ordering. Thus we extend $\sqsupseteq_u$ to a total ordering $\sqsupseteq^t_u$ as follows: If $u_1$ is related to $u_2$ under $\sqsupseteq^t_u$, then they are related in the same way under $\sqsupseteq^t_u$. Otherwise, $u_1 \sqsupseteq^t_u$ iff path−diff(u; $u_1$) is at most path−diff(u; $u_2$). Clearly, there are multiple ways to extend a partial ordering to a total ordering. This particular definition gives priority to the path difference, and is the one preferred in connection with the present invention. In simple terms, the selection algorithm first looks for objects with the same URL, then objects in the same directory, then objects in a different directory but one having the same parent directory, and so on, with increasingly larger path difference in URLs. If there is a tie, URLs with longer segments are preferred.

Figure 5:
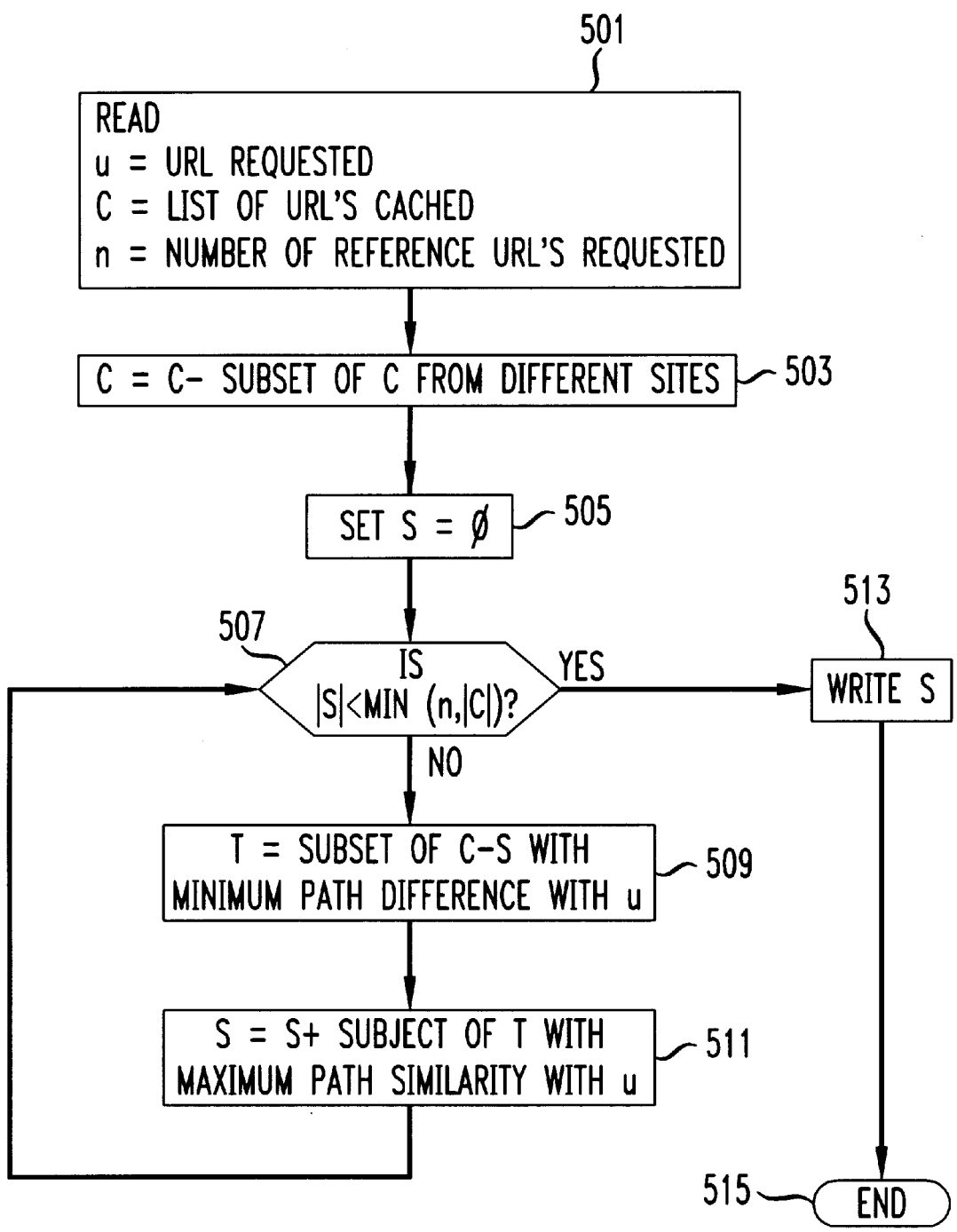
FIG. 5 is a diagram illustrating the selection process performed in step 307 of FIG. 3.

The selection process of the present invention, performed in step 307 of FIG. 3, is illustrated in FIG. 5. As stated above, the selection algorithm contains the heuristics for finding objects that have similar content to object O. The selection algorithm works on the assumption that objects that have similar names tend to have similar content. The selection heuristic tries to minimize the path difference, while maximizing the path similarity. A filtering step removes all the URLs that do not belong to the same site as u.

Three sets of inputs are read in step 501: u, the name of object O, C the names of objects cached, and n the number of similar names requested. Next, in step 503, the set of names of objects that corresponds to objects from different sites is removed from C. The result set S is initialized to be empty in step 505.

A test is next performed in step 507 to determine if the size of S is smaller than either n or the size of C. If a "no" result is obtained in step 507, (the exit condition is false), the process proceeds to steps 509 and 511, in which we add to the set S the names that have the maximum path similarity with u till exit condition is true. In case of a tie, we choose names with the smallest path difference. The process then returns to step 507. On the other hand, when a "yes" result is obtained in step 507, (the exit condition is true), then S contains the list $\{u_1 \ldots u_n\}$. Accordingly, the list S is written in step 513 and the selection process terminates in step 515.

From the foregoing, it is seen that the selection process of the present invention examines URLs in the set C of URLs that are available for selection, and selects the top n most similar URLs from that set, where n is the maximum number of most similar URLs needed. The selection heuristic tries to minimize the path difference, while maximizing the path similarity. The filtering step (step 503) removes all the URLs that do not belong to the same site as the original URL.

Referring now to FIG. 6, there is shown a diagram illustrating the decoding process performed in step 215 of FIG. 2. The decoding process is the reverse of the encoding process described above in conjunction with FIG. 4. The process begins in step 601, in which the encoded version O' of object O, and the list of reference objects $\{O_1 \ldots O_m\}$ are read. Recall that these reference objects were used when O was encoded to generate O'. Next, in step 603, O is initialized to a null string and the current pointer is initialized to the beginning of O'.

Next, the value of O' is examined in step 605 to determine if it is a null string, indicating that processing has been completed. If the result in step 605 is "no", the process proceeds to steps 609, 611 and 613. Here, for each token contained in O', the token is checked in step 611 to see if it is a character token or a triple token. For a character token, the result in step 611 is "yes", and the character is appended to O in step 615. For a triplet token $\{k, pos, I\}$, the string starting at position pos of object $O_k$ with length I, is appended to the O in step 613. When all the tokens have been processed, the result in step 605 is "yes". At that point, the value of O is written in step 607, and the process terminated in step 617.

The advantages of the compaction technique of the present invention were verified experimentally. We determined that the selection process described in FIG. 5 in a real-life browsing session actually can pick out "good" reference objects that are useful in the encoding procedure of FIG. 4. We demonstrated that objects high in the similarity ordering served better as reference objects than those low in the similarity ordering. We also determined that typical browsing patterns of actual users contain sufficient locality such that reference objects with high content similarity (as defined by the similarity ordering) are frequently available in the client cache, and hence can be selected.

We also performed actual downloading of Web objects using compaction, and computed the actual savings and compared that with the results of identical downloadings under gzip and diff. We also computed and compared the average latency incurred by compaction, gzip and diff under various link bandwidth. In general, HTML pages that are being updated continuously (stock quote, sports scoreboard, newspaper headlines, weather, movie showtimes, etc.) can be transferred very efficiently using the present invention.

In other experiments, we computed the actual amount of savings using the present invention (i.e., selection, encoding and decoding) for actual access traces. We took a specific multi-day server log, divided it into per-user access traces, performed the present invention for each such trace, and computed the mean compression ratio. We were able to extract 3,296 user access trace (based on unique IP addresses) that we "followed" using npact, gzip and diff. In summary, 86% of all users would benefit from the use of npact. The larger the number of accesses, the more likely that npact would perform better. It can also be observed that substantial savings were possible even for users with very few accesses.

Our idea of cache-based compaction is based on a simple observation: A dictionary-based compression scheme works better if the available dictionary is bigger. Thus by leveraging the objects that are already in a client's cache as the "extended" working dictionary, the transfer of an object can be further optimized compared to having only the object itself as the working dictionary. Obviously, the extended dictionary is useful only if it includes common "vocabularies" or substrings as the requested object.

Two reasons combine to explain why our proposal works for Web transfer. First, HTML pages that are "close" together (e.g., same directory, same subtree, same site) typically share similar overall style and hence formatting instructions. Our compaction technique can effectively "extract" these similarities out. Second, most Web client access patterns exhibit strong spatial locality, mostly because of the hierarchical grouping of pages pertaining to similar topics of interest to a client. In other words, for majority of Web access, some files "close" to the object being requested have already cached, thus enabling compaction.

Our definition of similarity ordering based on path similarity and difference is one, and a good, way to capture the "closeness" of two objects in a hierarchy. There are other possible heuristics on a similar vein. For example, one way to indicate how "similar" two strings are is the notion of edit distance, which is the minimum number of primitive editing instructions that are needed to convert one string to the other.

Another useful contribution of the present invention is that it nicely ties together compression, caching and prefetching. It relates compression and caching by providing a way to leverage the cached objects to improve compression. For prefetching, one can potentially use the idea of compaction to hedge against prefetching the "wrong" objects by prefetching instead a set of objects that are most likely to be "similar" to the objects that will be needed in the future. This relaxes the selection criteria for prefetching and significantly alleviates the penalty of incorrect prefetching. Our compaction technique also appears to be relatively immune from the changing nature of Web content. One of the main trends in Web content is the increasing use of CSS, DHTML, and even XML. All of these, especially XML which employs application-specific tags, are well suited for compaction. Specifically, they all try to introduce consistency and uniformity across Web documents. This translates into useful "similarity" that can be exploited using compaction.

A number of interesting extensions are possible with our compaction idea. We briefly describe two here: (1) Instead of having a fixed selection algorithm, the selection algorithm can be tailored on a per-site basis. Specifically, selection module can be downloaded dynamically when a site is first visited. The benefit of this is that a site should have a better idea of its own structure, and hence a better idea of selecting "similar" reference objects. An incentive of doing this is reduced transfer time (thus less WAN usage cost), and improved user satisfaction. The downloading process is especially simple if the selection module is coded in Java. (2) A push service (e.g., daily newspaper in HTML) can benefit from compaction by pre-computing a dictionary and downloaded that in advance. Each new object to be pushed can be compacted against the pre-computed dictionary before downloading.

The technique of compaction can be applied to other domains in addition to Web browsing. For example, we believe it is also applicable to electronic mail, and can potentially be a part of a generic wireless middleware layer.

Apart from the above, a few other details must be considered in the implementation. They are:

1. A URL can refer to dynamically varying content. In other words, it is possible that the client and the server proxies may have different ideas about the content of an object with the same URL. A simple way to overcome this is to include some form of unique ID (e.g., a hash value) along side with each referenced URL. We note that the hash value need not be computed on demand, it can be pre-computed by the server when an object is first generated or fetched.

2. The objects $\{u_1 \ldots u_n\}$ must be "pinned" down by the client proxy as long as they are referenced in an outstanding request. This prevents their flushing until the response is received. Obviously, they should also be "unpinned" if the request is terminated abnormally.

3. As a practical optimization, the server proxy should send uO instead of u only if their size difference exceeds a certain threshold. The value of the threshold should partially depend on the link speed between the client and server proxies.

What is claimed is:

1. A process for transferring information defining a desired Internet object from a web server to a web client having a client cache, said process comprising the steps of selecting one or more objects in said client cache similar to said desired Internet object;

transmitting to said web server, (a) information identifying said desired internet object and (b) information identifying said selected similar objects, obtaining said desired Internet object in said web server;

forming an encoded version of said desired Internet object in said web server using ones of said selected similar objects obtained from said client cache as reference objects;

transmitting said encoded version from said web server to said web client; and decoding said encoded version using said ones of said selected similar objects to recover said desired internet object.

2. The process defined in claim 1 wherein said web server includes a server cache and wherein said obtaining step includes obtaining said desired Internet object from said server cache, if present, or, if not present, from a remote origin server.

3. The process defined in claim 1 wherein said obtaining step includes obtaining said desired Internet object from a remote origin server.

4. The process defined in claim 1 wherein said process includes the steps of accessing said client cache to determine the presence of said requested Internet object prior to performing said selecting step, and providing said requested object to a web browser application if said requested Internet object is present in said client cache.

5. The process defined in claim 1 wherein said selection step includes examining the URL's associated with said desired Internet object and objects stored in said client cache.

6. The process defined in claim 5 wherein said information identifying said desired internet object and said information identifying said selected similar objects includes the respective URL's of said objects.

7. The process defined in claim 1 wherein said forming step includes determining the difference between said desired internet object and said selected similar objects.

8. The process defined in claim 1 wherein said obtaining step includes transmitting the URL of said desired Internet object to an origin server containing information defining said object.

9. The process defined in claim 1 wherein said forming step includes differential encoding, and said decoding step includes differential decoding.

10. A process in a web client having a client cache for obtaining information defining a desired Internet object from a web server, said process comprising the steps of selecting one or more objects in said client cache similar to said desired Internet object;

transmitting to said web server, (a) information identifying said desired internet object and (b) information identifying said selected similar objects, receiving from said web server, an encoded version of said desired internet object, said encoded version being formed as a function of the differences between said desired internet object and ones of said selected similar objects; and decoding said encoded version using said ones of said selected similar objects to recover said desired internet object.

11. A process in a web server, for transferring information to a web client having a client cache, said information defining an Internet object desired by a user of said web client, said process comprising the steps of receiving from said web client, (a) information identifying said desired internet object and (b) information identifying selected similar objects in said client cache similar to said desired Internet object, obtaining said desired Internet object in said web server;

forming an encoded version of said desired Internet object in said web server using ones of said selected similar objects as reference objects; and transmitting said encoded version from said web server to said web client.

12. The invention defined in claim 11 wherein said web server includes a server cache, and wherein said obtaining step includes obtaining said desired Internet object from said server cache, if present, or, if not present, from a remote origin server.

13. A method of processing a request to receive an object, said request generated by a user by selecting the URL of said object in a web browser application running on a client processor, said method including the steps of determining if said object is already in a local client cache;

if so, presenting said object to said user's web browser application;

if not, identifying objects similar to said requested object in said local cache;

transmitting to a remote server, a request to obtain said requested object, said request including (a) the identity of said requested object and (b) the identities of objects similar to said requested object that are stored both in said local cache and in a cache serving said remote server;

responsive to receipt of said request, obtaining in said server said requested object;

forming an encoded version of said requested object using ones of said similar objects and said requested object;

transmitting said encoded version to said client processor; and decoding said encoded version using said ones of said similar objects; and presenting said requested object to said web browser application.

14. The invention defined in claim 13 wherein said identification of said ones of said similar objects includes determining the similarity between the URL of said requested object and the URL's of other objects in said local client cache.

* * * * *